United States Patent [19]

Banta

[11] Patent Number: 4,823,498
[45] Date of Patent: Apr. 25, 1989

[54] LINE CUTTING TOOL AND MOUNTING BASE THEREFOR

[75] Inventor: Larry D. Banta, Hillsboro, Oreg.
[73] Assignee: LCD American, Inc., Beaverton, Oreg.
[21] Appl. No.: 30,219
[22] Filed: Mar. 25, 1987
[51] Int. Cl.$^4$ ............................................. A01K 87/00
[52] U.S. Cl. ...................................................... 43/25
[58] Field of Search .............................. 43/25; 30/291

[56] References Cited

U.S. PATENT DOCUMENTS

| | | | |
|---|---|---|---|
| 611,313 | 9/1898 | Crandall | 30/291 |
| 1,407,446 | 2/1922 | Sutton | 30/291 |
| 1,536,752 | 5/1925 | Beatty | 30/291 |
| 1,851,370 | 3/1932 | Munger | 43/25 |
| 2,254,199 | 9/1941 | Baltuch | 30/289 |
| 2,561,289 | 7/1951 | Paris | 43/25 |
| 2,698,503 | 1/1955 | Haworth | 43/25 |
| 3,128,023 | 4/1964 | Cook | 43/25 |
| 3,436,870 | 4/1969 | Sellman | 43/25 |
| 3,521,393 | 7/1970 | Gordon | 43/25 |

Primary Examiner—M. Jordan
Attorney, Agent, or Firm—Klarquist, Sparkman, Campbell, Leigh & Whinston

[57] ABSTRACT

A line cutting apparatus includes a cutting tool and a mounting base separate from the tool. In the present embodiment, the mounting base is adapted for attachment to a fishing rod. The cutting tool and mounting base include interconnecting means for removably engaging the tool to the base. The cutting tool includes a tool housing that encloses a blade but defines limited access openings to expose portions of a blade cutting edge. Each opening is defined by a pair of lips projecting beyond the blade cutting edge and being spaced apart less than the length of the exposed edge. The tool housing also defines a receptacle for retaining a sharpening stone in alignment with the blade. The tool housing is shaped along its undersurface to provide a gap between the tool and mounting base. This gap enables the fishing rod and attached mounting base to flex without interference from the tool.

25 Claims, 2 Drawing Sheets

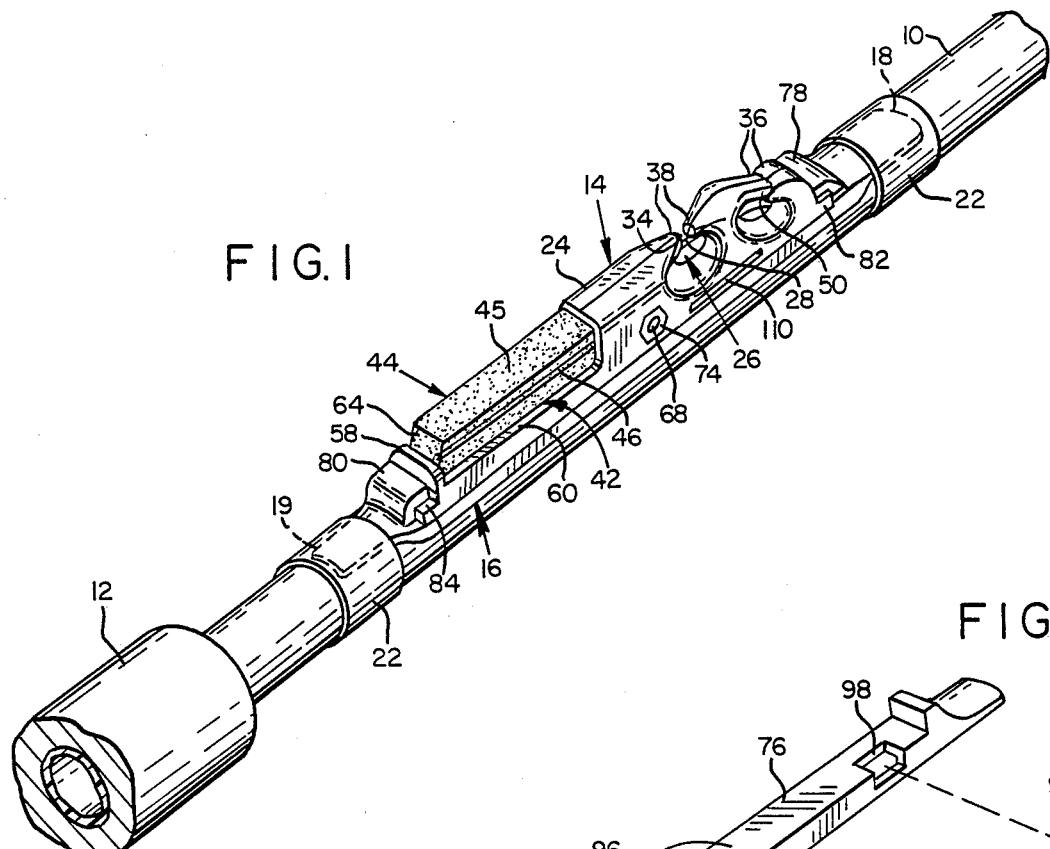

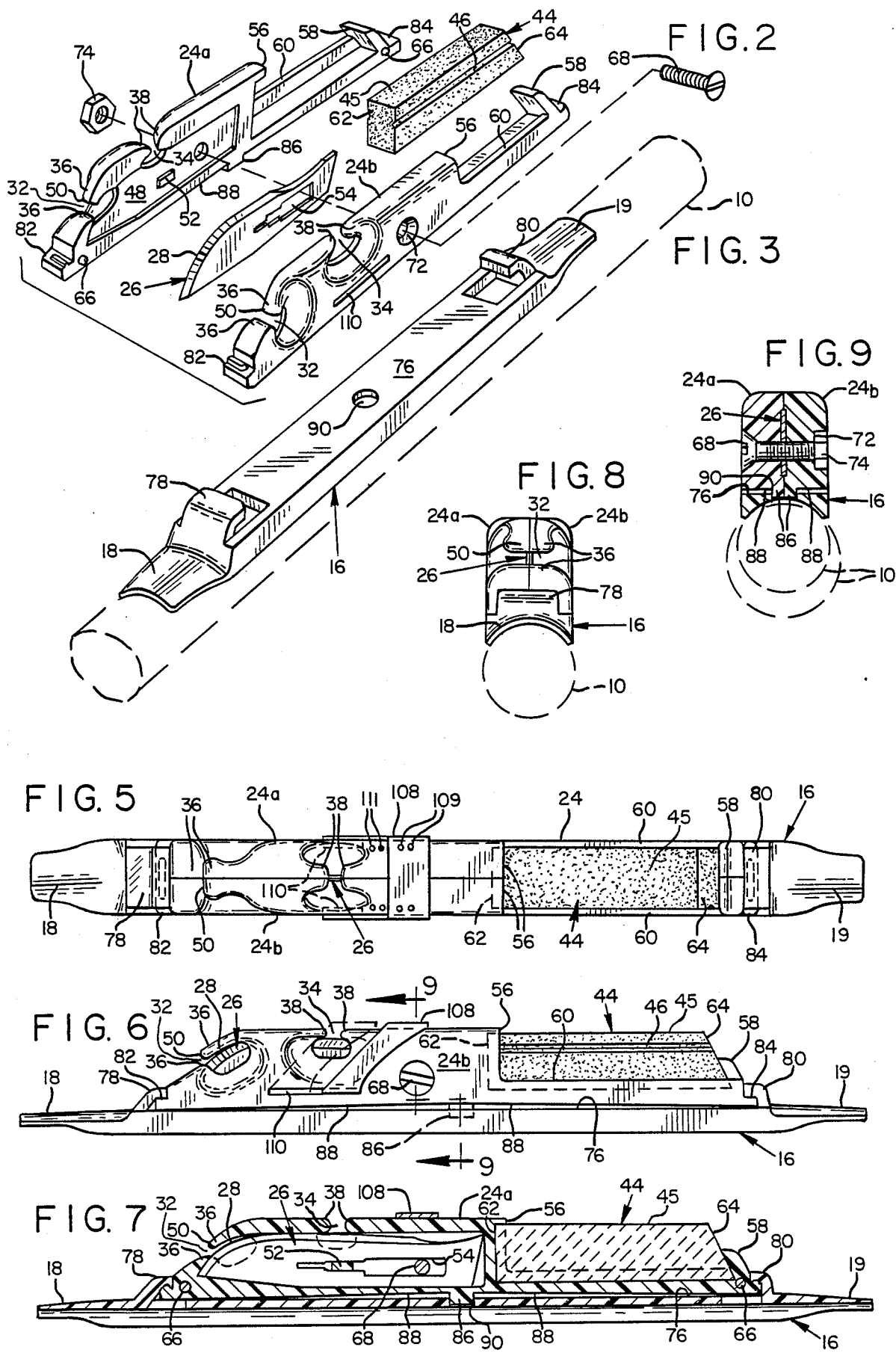

LINE CUTTING TOOL AND MOUNTING BASE THEREFOR

BACKGROUND OF THE INVENTION

This invention relates to line cutting apparatus and more particularly to fishing line cutting tool that may be removably mounted to a number of fishing rods.

As most fishermen know, there are many tasks in fishing that interfere with the actual fishing time. The more time these tasks take, the less time spent fishing. Two of the more time-consuming tasks are changing the fly, lure, or baited hook attached to the line or leader, and sharpening the hook. Traditionally, these tasks are accomplished with scissors, knife, or nail clippers to cut the line or leader and a sharpening stone to sharpen the hook. Most fishermen endeavor to keep these tools handy by carrying them in a vest or pants pocket or in a fishing carryall. Even if one knows of the tools' whereabouts, however, there is always some amount of searching and fumbling before they can be located. Even worse, an object as small as a knife or sharpening stone is easily lost or misplaced, causing the fisherman much frustration and loss of valuable time while hunting for the elusive tool.

To assist the fisherman in these tasks, a number of line cutting tools have been devised that mount directly to the fishing pole. A primary example of such devices is disclosed in U.S. Pat. No. 3,521,393 to Gordon. The Gordon device includes a piston and cylinder combination welded to an attached base which in turn is permanently bound to the fishing rod with fishing line or the like. The piston has a cutting edge which coacts with an edge of the cylinder to make the desired cut in the line. The Gordon device also includes a flat sharpening stone mounted on top of the cylinder for sharpening a fishhook.

Although an improvement over the traditional separate knife and sharpening stone, the Gordon device has a number of drawbacks. For one, the piston and cylinder combination is not easily cleaned and therefore may be subject to frequent jamming. For another, the combination is not easily disassembled for replacing the piston or sharpening the cutting edges. Still another drawback is the device's lack of mobility. Its base is designed to be permanently mounted to a single fishing rod. One cannot easily transfer the device to a different rod or pole without cutting the retaining lines and spending considerable time remounting the combination. In addition to these disadvantages, the device acts as a splint which inhibits free flexing of the fishing rod to which it is bound. Such flexing is often critical to rod balance and in landing a fish.

Another example of a prior line cutting tool is disclosed in U.S. Pat. No. 2,561,289 to Paris. The Paris device includes a whetstone and a blade mounted on opposite sides of a sleeve which is designed to be clamped to the fishing rod. A blade cover is pivotally hinged to the sleeve for protectively enclosing the blade cutting edge. The cover is pivoted away from the blade to expose the entire edge for cutting the fishing line. The cutting edge, however, presents a danger to the fisherman when so exposed. When attempting to cut a fishing line, one could easily cut a finger on the sharp edge. Moreover, like the Gordon device, the Paris device is not easily transferable from a rod of one diameter to a rod of another diameter. The sleeve is attached by a number of bolts and nuts which would have to be removed and reattached each time the device is to be mounted on another rod. Additionally, the sleeve would likely interfere with the flexing of the rod.

The line cutting tool disclosed in U.S. Pat. No. 3,128,023 to Cook suffers from similar disadvantages. The Cook device is basically a blade mounted to the rod by rubber bands wound about the device's base. A number of notched openings in a covering body attached to the base expose portions of the blade's cutting edge for cutting the fishing line. The blade edge in Cook is exposed and could easily nick a finger of a fisherman attempting to cut the fishing line. And as with the other prior devices, the Cook device cannot be transferred from a rod of one diameter to a rod of a different diameter and likely limits the flexing of the fishing rod.

Other devices for cutting fishing line or sharpening hooks are shown generally in U.S. Pat. No. 1,851,370 to Munger, U.S. Pat. No. 2,698,503 to Haworth, and U.S. Pat. No. 3,436,870 to Sellman. All these devices suffer from one or another drawback such as described herein which have discouraged their commercial use.

SUMMARY OF THE INVENTION

An object of the invention, therefore, is to provide an improved line cutting tool adapted for mounting to a fishing rod but also adaptable to be mounted elsewhere for other applications or used free-hand.

Another object of the invention is to provide such a cutting tool which may be easily mounted to and removed from a mounting base for transfer from one base to another.

Yet another object of the invention is to provide such a cutting tool whose cutting edge is fully shielded to prevent injury to the user yet fully accessible to the line to be cut.

Yet another object of the invention is to provide a tool whose proper use is apparent from its appearance and facilitated by its construction.

Still another object of the invention is to provide such a tool having a cutting blade and sharpening stone that can be easily sharpened, cleaned, or replaced.

A further object is to provide a line cutting tool that is easily used with one hand.

To achieve these objects, a line cutting apparatus according to the invention comprises a balanced line cutting tool and a mounting base separate from the tool. The tool and mounting base include interconnecting means for removably engaging the tool to the mounting base. For use with a fishing rod, a mounting base can therefore be permanently mounted to each rod of interest and the tool easily and quickly removed and transferred to numerous other rods as desired.

In the described embodiment, the tool is of a sufficiently low profile so as not to interfere with fishing line movement between the fishing reel and rod line guide. The tool includes a housing that encloses a blade but also defines a pair of limited access openings to expose portions of the blade cutting edge. Each opening is defined by a pair of spaced apart protective lips projecting beyond and over the blade cutting edge and being spaced apart less than the length of the exposed cutting edge beneath. At one opening, one lip extends over the other to shield the cutting edge and guide the line into the edge. At the other opening, the lips are spaced apart sufficiently to allow for cutting close to knots in the line and to fishing hardware. The housing also defines a rear receptacle for retaining a sharpening stone in alignment with the blade. The stone has a flat surface for sharpening knife blades and includes a groove for sharpening fishhooks.

To enable the fishing rod to flex with the tool and its attached base, a clearance is provided between the bottom of the tool and top of the mounting base. The base can be composed of a flexible material, allowing the base to flex readily with the rod action. The clearance is sufficiently great that the housing does not interfere with this flexing. Consequently, the housing can be composed of a more rigid material to retain securely the blade and sharpening stone.

In other aspects of the invention, the tool housing is designed to be easily assembled and disassembled for replacement of the blade or the sharpening stone. The tool may also include a movable blade guard for covering the larger defined opening to shield the exposed portion of the blade edge.

The foregoing and other objects, features, and advantages of the invention will become more apparent from the following detailed description of preferred embodiments which proceeds with reference to the accompanying drawings

BRIEF DESCRIPTION OF THE DRAWINGS

FIG. 1 is a perspective view of an apparatus according to the invention shown affixed to the butt end of a fishing rod in front of the rod handle.

FIG. 2 is an exploded view of a fishing tool included within the apparatus.

FIG. 3 is a perspective view of a mounting base included within the apparatus.

FIG. 4A shows one modified embodiment of interconnecting means for removably engaging the tool housing to the mounting base.

FIG. 4B shows another modified embodiment of interconnecting means for removably engaging the tool housing to the mounting base.

FIG. 5 is a top plan view of the apparatus including a blade guard.

FIG. 6 is a side view of the apparatus in FIG. 5.

FIG. 7 is a longitudinal cross-sectional view of the apparatus in FIG. 5.

FIG. 8 is a front view of the apparatus in FIG. 5.

FIG. 9 is a cross-sectional view of the apparatus taken along line 9—9 of FIG. 6.

DETAILED DESCRIPTION

With reference now to FIG. 1 of the drawings, there is illustrated the butt end of a fishing rod 10 with the rod handle 12 at the left of the figure and the tip of the rod out beyond the right of the rod section shown. Mounted adjacent the handle 12 is an apparatus according to the invention comprising a cutting tool 14 removably engaged to a mounting base 16. In the position shown, the tool 14 is located conveniently close to the hands of the fisherman on the top surface of the rod 10 yet is of sufficiently low profile so as not to interfere with fishing line movement between the fishing reel and rod line guide The tool and base may, however, be mounted on any surface of the rod. At opposite ends of the base 16 are forward and rearward tongues 18, 19 which yieldingly adapt to match the curvature of any fishing rod 10. The tongues 18, 19 may be secured to the rod 10 by tape 22 or other suitable means.

The tool 14 includes a low profile housing 24 which retains means for cutting fishing line such as a replaceable stainless steel or other rust resistant blade 26. All exterior surfaces of the housing 24 are textured to eliminate sun glare. The housing radially mounts the blade 26 relative to the fishing rod 10. Portions of the blade cutting edge 28 are accessible to line through limited access forward and rearward openings 32, 34, each defined by a pair of lips 36, 38. The housing 24 is dished inward around each pair of lips 36, 38 for allowing close but protected access to the cutting edge 28. Each lip pair projects over its adjacent portion of cutting edge 28 and is spaced apart less than the length of the exposed edge. The spacing between each lip of a pair is such that a line can penetrate therebetween but a finger cannot. In the present embodiment, this spacing is between one and two millimeters. Rearward of the lips 38, the housing 24 defines an upper rear receptacle 42 for retaining sharpening means such as a rectangular block-shaped sharpening stone 44 aligned lengthwise with the blade 26. The stone 44 has a flat sharpening top surface 45 for honing knives and the like. For sharpening fishing hooks, a longitudinal groove 46 is milled near the top of and into each side surface of the stone, the latter for allowing easy sharpening for left- and right-handed fishermen.

FIG. 2 is an exploded view of the apparatus showing the detailed construction of the tool 14. The tool housing 24 comprises a pair of longitudinal sections 24a and 24b. The inner faces of sections 24a, 24b are recessed at a forward portion 48 to retain blade 26 securely in proper position relative to the openings defined by the lips 36, 38. The upper lip 36 includes a nose 50 shown best in FIG. 8 shaped to extend over the lower lip 36. The nose 50 shields the edge 28 and its inside surface and also serves to force or guide a fishing line drawn through the defined opening 32 along the blade 26 and downward onto the blade edge 28, as shown best in FIGS. 6 and 7. Additionally, a stop or lug 52 on section 24a fits within a similarly sized front portion of a slot 54 through the blade 26 to hold the blade securely in place when the sections 24a, 24b are fastened together. The rearward receptacle 42 is a generally rectangular box defined by an angular front retaining wall 56, rearward inclined wall 58, and longitudinal sidewalls 60, one on each section 24a, 24b. The front and rear walls 56 and 58 are sized and shaped to embrace, respectively, forward and rearward ends 62, 64 of the stone 44 to retain the stone when the sections 24a, 24b are joined. Front wall 56 includes an upper lip which overlaps a short upper surface portion of the stone and coacts with sloping rear wall 58 to retain the stone within the receptacle.

The two housing sections are aligned for enclosing he blade 26 and stone 44 by means such as projecting pins 66 on section 24a and mating sockets (not shown) on section 24b. The sections are fastened together by a bolt 68 sized to extend through a housing aperture 72 in each section and a similarly sized rear portion of blade slot 54 to be retained by a mating nut 74. FIG. 9 shows that the bolt 68 and nut 74 are mounted flush within the housing sections 24a, 24b when tightened in place.

Referring to FIG. 3, the mounting base 16 includes an elongated flat upper surface 76 between the tongues 18, 19. Forward and rearward stops such as overhanging retaining tabs 78, 80 are formed at opposite ends of surface 76. Each overhang has a recess 79, 81 (FIG. 5) on its underside to receive a lug 83, 85 (FIG. 7) on the tool 14 and retain the tool thereon, as will be further described.

For removably engaging the tool 14 to the base 16, interconnecting means are provided on the base and tool housing 24. FIGS. 2, 3, and 7 show best one embodiment of such means. The housing sections 24a, 24b when joined form forward and rearward shoulders 82, 84 for sliding beneath the coacting overhangs 78, 80 on base 16. Each shoulder 82, 84 has a lug or detent 83, 85 thereon for snapping into the mating recesses 79, 81 on the overhangs 78, 80. A locating pin 86 (shown best on section 24a) projects from housing undersurface 88 that is adjacent the base 16 when the tool 14 and base are interconnected. The pin 86 is adapted to seat within a mating recess 90 within mounting surface 76 of the base. The overhangs 78, 80 are spaced apart the length of the tool 14. The tool 14 is engaged to the base by laterally sliding it onto the surface 76 until the pin 86 snaps into the recess 90 and the shoulder lugs 83, 85 engage the recesses 79, 81 of overhangs 78, 80.

Other embodiments of the mounting base and tool with somewhat different connecting means are, of course, possible as well. FIG. 4A shows a second embodiment with L-shaped projections or lugs 92, 94 on the undersurface 88 of the tool sized to lock within mating recesses 96, 98 of base mounting surface 76. Projection 92 is first hooked into recess 96 and then tool 14 is turned and projection 94 hooked into recess 98. FIG. 4B shows yet another embodiment of the tool and mounting base with a different interconnection. Disk-shaped projections 100, 102 along with locating pin 86 are provided on undersurface 88 of the tool. The projections 100, 102 are adapted to twist or slide laterally into seated engagement with locking recesses 104, 106 on the mounting surface of the base as the tool 14 is pivoted about pin 86 seated within locating recess 90. In these two embodiments, stops in the form of overhangs 78, 80 are not required but cooperative retaining recesses and lugs are.

One drawback of many prior line cutting devices is the loss of flexibility in the fishing rod ahead of the butt section caused by the attached cutting tool. Some flexibility can be maintained by making the tool from a flexible plastic or the like. But the tool when mounted directly to the rod 10 still has the effect of a splint. The present invention avoids this splint effect by providing a gap or clearance 89 at the interface between mounting base 16 and the tool housing 24, more specifically between surface 88, 76. Referring to FIGS. 6 and 7, it can be seen that the housing 24 is shaped along undersurface 88 to define the gap 89 between end points interconnecting the tool and base. The clearance enables the base 16, composed of a flexible material, to flex with the fishing rod while still retaining the housing 24. The tool housing, on the other hand, can be made of a more rigid material to retain the blade 26 and stone 44 securely.

The access openings 32, 34 to the cutting edge 28 are provided for cutting close to knots in the line or cutting close to fishing hardware To shield fully the exposed cutting edge 28 thereunder, a blade guard 108 may be provided The guard is slidably mounted in slots 110 in the housing 24 for longitudinal movement between forward and rearward positions defined by detents and dimples 109, 111. In its forward position, shown in dashed lines in FIG. 6, the guard 108 overlays the lips 38 and covers the opening 34 and blade edge 28. In its rearward position, shown in solid lines in FIG. 5, the guard 108 is retracted to expose the lips, opening and cutting edge. The slot 110, detents 109, and dimples 111 maintain the guard 108 in its selected position.

Operation of the tool 14 is apparent from its appearance and facilitated by its unique construction. By placing the rod 10 between the legs or under the arm, a fisherman may, with both hands free to hold line and gear, cut the line or leader by drawing it through either the forward or rearward openings defined by lips 36, 38 and then across exposed cutting edge 28. The undersurface of nose 50 forces the line downward against edge 28 as the line is drawn upward into the V-slot formed by such undersurface and edge. For the severing of knots, the line is passed through either opening defined by lips 36, 38 and drawn across the exposed blade edge 28. The guard 108 is moved forward to cover opening 34 and the edge 28 and rearward to expose the edge by applying pressure to the guard's top surface to disengage the detents 109 from the dimples 111 and pushing or pulling on the guard, respectively, until the detents and dimples again engage.

A knife blade is easily sharpened by drawing it across the flat surface 45 of stone 44. A fishhook is sharpened by drawing the pointed tip along the sharpening groove 46 on either side of the stone 44.

One tool 14 can adequately serve numerous rods 10 by attaching separate mounting bases 16 to each of such rods. The tool 14 is then easily transferred from one rod to another by pulling up slightly thereon to disengage the pin 86 from the recess 90 and then sliding the tool laterally free of the selected interconnecting means.

The blade 26 or stone 44 can be easily cleaned, sharpened or replaced by unscrewing the bolt 68 and quickly disassembling and reassembling the housing sections 24a, 24b as shown in FIG. 2.

Although the present embodiment describes the apparatus in its application to a fishing rod, the invention is not so limited. The tool 14 and mounting base 16 may also be mounted on a flat surface such as a sewing machine cabinet or adjacent wall for cutting thread, yarn, or line. The tool 14 may also be used without the mounting base 16 as a hand-held cutting tool where applicable. The stone 44 may be replaced with a magnetic or cork pin cushion to retain pins, needles, and other sewing accessories.

Having illustrated and described the principles of the invention in preferred embodiments, it should be apparent to those skilled in the art that the invention can be modified in arrangement and detail without departing from such principles. I claim the preferred embodiments and all modifications coming within the spirit and scope of the following claims.

I claim:

1. A fishing line cutting apparatus for attachment to a fishing rod shaft, comprising:
    a line cutting tool including mounting means for removably mounting a cutting element for cutting fishing line; and
    a mounting base separate from the tool for mounting the tool and including means for attaching the base to the fishing rod shaft, the base and tool including cooperative interconnecting means for removably connecting the tool to the base and thereby to the fishing rod.

2. The line cutting apparatus of claim 1 including replaceable cutting means retained by the mounting means of the tool for cutting fishing line.

3. The line cutting apparatus of claim 1 in which the tool and base are shaped along their confronting surfaces to provide a gap therebetween and said base is longitudinally flexible for enabling the mounting base to flex with the fishing rod shaft while retainingly engaging the tool.

4. The line cutting apparatus of claim 1 in which the base includes forward and rearward tongues adapted to be secured to the fishing rod for retaining the base thereon.

5. A line cutting apparatus, comprising:
a blade having a cutting edge;
a tool housing for mounting the blade, the housing retaining the blade but defining a limited access opening to expose a portion of the blade cutting edge; and
a mounting base separate from the housing,
the base and housing including interconnecting means for manually removably connecting the housing to the base independently of the mounting of the blade in the housing.

6. The line cutting apparatus of claim 5 in which the housing includes lip means overlying the cutting edge to define said limited access opening.

7. The line cutting apparatus of claim 6 in which said lip means defines with an underlying cutting edge portion a slot of progressively diminishing dimension from the access opening for guiding the line toward the cutting edge.

8. The line cutting apparatus of claim 5 in which the interconnecting means comprises forward and rearward shoulders on the housing and forward and rearward overhangs on the base, the shoulders matingly engaging the overhangs.

9. The line cutting apparatus of claim 8 in which the interconnecting means includes mating lugs and recesses on the base and housing associated with said shoulders and overhangs to facilitate manual removal and connection of said housing to the base and retention of the housing on the base.

10. The line cutting apparatus of claim 5 in which said lip means define a second access opening spaced along the cutting edge from the first access opening.

11. The line cutting apparatus of claim 5 in which the interconnecting means comprises a locating pin projecting from the undersurface of the housing for rotatably engaging a mating recess in the base and having first and second lugs projecting from the undersurface to engage first and second recesses in the base for locking the housing to the base when the housing is rotated about the pin into a position parallel to the base.

12. The line cutting apparatus of claim 5 including a blade guard mounted for sliding movement longitudinally along the housing for covering and uncovering the defined opening, the guard thereby selectively blocking access to the blade cutting edge.

13. The line cutting apparatus of claim 5 including sharpening means, the housing shaped to define a receptacle for retaining the sharpening means.

14. The line cutting apparatus of claim 5 in which the housing comprises a pair of longitudinal half sections removably joined together to enclose the blade and retail the sharpening means.

15. A mounting base for removably mounting on a fishing rod shaft a line cutting tool having a housing with locating and retaining lugs, said base comprising:
an elongate body terminating at a pair of opposite end tongues and a mounting surface between said tongues; said body being longitudinally flexible to flex with a fishing rod shaft on which it is mounted and having a transversely concave bottom surface for conforming substantially with the convex surface of the rod shaft when mounted thereon; and
means defining retaining recesses adjacent opposite ends of said mounting surface for coacting in a releasable interlocking relationship with lugs of the cutting tool.

16. The mounting base of claim 15 in which the retaining recesses are on the undersides of overhangs at opposite ends of said surface.

17. The mounting base of claim 15 including a pair of recesses within said mounting surface for engaging hook-shaped lugs on the tool.

18. A line cutting tool comprising:
a tool housing for retaining a cutting means, the housing including a first protective lip means defining a first limited access opening for exposing a portion of the cutting means, said lip means overlying and defining with the cutting means a slot of progressively diminishing dimension beneath said lip means and operable to guide the line onto the cutting means when the line is drawn through said opening and into said slot,
the housing including a mounting base portion and a means for mounting a single cutting blade as said cutting means with the cutting edge of the blade directed away from the mounting base portion along a forward and upper portion of the housing, said housing further including receptacle means for retaining an abrasive sharpening means rearwardly of said blade, said receptacle means opening in an upward direction to provide access to the abrasive means from an upper portion of the housing.

19. The tool of claim 18 wherein said housing comprises a pair of complementary transversely opposed longitudinally extending halves and connecting means for joining the halves together with said blade therebetween.

20. The tool of claim 19 wherein said connecting mean comprises a threaded fastener means extending through an opening in said blade to help retain said blade between said halves.

21. The tool of claim 20 wherein at least one of said halves includes positioning means cooperable with said blade and fastener means to position said blade between said halves with a cutting edge portion exposed within the limited access opening.

22. The tool of claim 21 wherein said lip means defining a pair of said limited access opening, one at a forward end of the housing and the other along a top of the housing.

23. The tool of claim 18 wherein said housing is elongate and relatively narrow and wherein said tool includes an elongate mounting base separate from said housing and including manually operable interconnecting means for removably connecting said base portion of the housing to said mounting base, said mounting base including means, including forward and rearward tongues and a transversely concave undersurface, for mounting on the shaft of a fishing rod, said mounting base being longitudinally flexible, said base and housing having opposed confronting surfaces normally spaced from one another along a major intermediate portion of their lengths such that said base can flex with said rod shaft while said base and housing are interconnected.

24. The apparatus of claim 1 wherein the mounting means of the tool includes means for mounting a cutting blade as the cutting element such that the blade has an upwardly directed cutting edge and lies in a plane containing the longitudinal axis of the fishing rod shaft when the mounting base is mounted to an upper surface of the fishing rod shaft.

25. A line cutting tool for a fishing rod or the like, the tool comprising:
- a tool housing for retaining a cutting means, the housing including a first protective lip means defining a first limited access opening for exposing a portion of the cutting means along an upper portion of the housing,
- the tool housing adjacent to the protective lip means defining a first pair of opposite side recesses leading to the exposed portion of the cutting means from opposite sides of the housing for enabling insertion of a line portion next adjacent to a knot in the line into the access opening for cutting at the knot;
- second protective lip means defining a second access opening spaced along the housing from the first access opening for exposing a second portion of the cutting means, and said housing defining adjacent said second protective lip means a second pair of opposite side recesses leading to the second exposed portion of the cutting means;
- the first protective lip means being at an upper forward end portion of the housing and the second protective lip means being at an upper intermediate portion of the housing;
- said housing defining a receptacle for receiving and retaining a sharpening stone, said receptacle opening upwardly rearwardly of the second protective lip means;
- said housing comprising a pair of separate complementary opposite side sections, said sections including means cooperable with connecting means for retaining the cutting means in a predetermined cutting position within said housing between said side sections as said connecting means joins said sections together;
- and a mounting base separable from said housing including first mounting means for mounting the base on the shaft of a fishing rod and second mounting means for removably mounting the housing on the base manually without the aid of a tool.

* * * * *